(12) United States Patent
Samii et al.

(10) Patent No.: US 11,343,138 B2
(45) Date of Patent: May 24, 2022

(54) METHOD AND APPARATUS FOR FAULT TOLERANT ETHERNET TIME SYNCHRONIZATION

(71) Applicant: GM GLOBAL TECHNOLOGY OPERATIONS LLC, Detroit, MI (US)

(72) Inventors: Soheil Samii, Royal Oak, MI (US); Prathap Venugopal, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 16/856,098

(22) Filed: Apr. 23, 2020

(65) Prior Publication Data

US 2021/0336842 A1 Oct. 28, 2021

(51) Int. Cl.
*H04L 41/0668* (2022.01)
*H04J 3/06* (2006.01)

(52) U.S. Cl.
CPC ........ *H04L 41/0668* (2013.01); *H04J 3/0679* (2013.01)

(58) Field of Classification Search
CPC .............. H04L 41/00–5096; H04J 3/00–0697
See application file for complete search history.

(56) References Cited

U.S. PATENT DOCUMENTS

| | | | | |
|---|---|---|---|---|
| 8,775,681 | B2* | 7/2014 | Menon ..................... | H04L 12/40 709/248 |
| 8,917,628 | B2* | 12/2014 | Steiner ..................... | H04L 7/10 370/254 |
| 10,361,904 | B2* | 7/2019 | Ameixiera ............ | H04L 67/104 |
| 2004/0213295 | A1 | 10/2004 | Feher | |
| 2006/0020717 | A1 | 1/2006 | Remboski | |
| 2011/0320081 | A1* | 12/2011 | Ogura ................ | H04L 12/40169 701/22 |
| 2012/0166878 | A1* | 6/2012 | Sinha .................... | H04L 41/064 714/37 |
| 2012/0265359 | A1* | 10/2012 | Das ................... | H04L 12/40032 700/292 |
| 2014/0281037 | A1* | 9/2014 | Spada ................... | H04J 3/0641 709/248 |
| 2015/0188695 | A1* | 7/2015 | Crowell ................. | H04B 11/00 398/155 |
| 2016/0127118 | A1 | 5/2016 | Yun et al. | |
| 2016/0352388 | A1* | 12/2016 | Lane ......................... | H04L 7/08 |
| 2017/0085415 | A1* | 3/2017 | Ameixiera ............ | H04L 41/048 |
| 2017/0331670 | A1* | 11/2017 | Parkvall ............. | H04W 52/028 |

(Continued)

FOREIGN PATENT DOCUMENTS

CN 108173614 A 6/2018
WO WO-2020199116 A1 * 10/2020 ............ H04J 3/0644

*Primary Examiner* — Chi H Pham
*Assistant Examiner* — Vladislav Y Agureyev
(74) *Attorney, Agent, or Firm* — Lorenz & Kopf LLP (57) ABSTRACT

The present application generally relates to network timing synchronization in the presence of link faults including apparatus and methods In various embodiments, a method includes generating a time synchronization signal, transmitting the time synchronization signal from a first switch to a second switch via a first link and from the first switch to a third switch via a second link, detecting a link failure of the first link, and transmitting the time synchronization signal from the second switch to the third switch via a third link in response to the link failure.

19 Claims, 5 Drawing Sheets

(56) References Cited

U.S. PATENT DOCUMENTS

| | | | |
|---|---|---|---|
| 2018/0077034 A1* | 3/2018 | Liang | H04Q 9/00 |
| 2018/0159647 A1* | 6/2018 | Nayyar | G01S 13/87 |
| 2019/0253169 A1* | 8/2019 | Ha | H04J 3/0667 |
| 2020/0014525 A1* | 1/2020 | Nasr | G05D 1/021 |
| 2020/0106542 A1* | 4/2020 | Liu | H04J 3/0667 |
| 2020/0145293 A1* | 5/2020 | Terazawa | H04L 47/822 |
| 2020/0287803 A1* | 9/2020 | Sedarat | H04L 63/14 |
| 2020/0295860 A1* | 9/2020 | Mash | H04J 3/0647 |
| 2020/0295861 A1* | 9/2020 | Zinner | H04J 3/0661 |
| 2020/0389469 A1* | 12/2020 | Litichever | H04L 63/0236 |
| 2021/0006344 A1* | 1/2021 | Chen | H04L 12/40 |
| 2021/0302998 A1* | 9/2021 | Liu | G05D 1/0278 |

* cited by examiner

METHOD AND APPARATUS FOR FAULT TOLERANT ETHERNET TIME SYNCHRONIZATION

INTRODUCTION

The subject of the disclosure relates generally to data distribution in a motor vehicle and more particularly, to a method and apparatus for providing fault tolerant ethernet timing in a multiple time domain system in the presence of one or more hardware link failures.

Modern vehicle include many systems and subsystems for vehicle control, vehicle system monitoring and passenger comfort. As the level of sophistication of vehicle subsystems increase, such as with the deployment and performance of advanced driver-assistance systems (ADAS), the requirement for reliable subsystem to subsystem communications and monitoring will increase. Communications between vehicle subsystems has been employed to allow sensor data to be shared among vehicle subsystems thereby reducing the occurrence of redundant duplicate sensors. This communication between vehicle subsystems has traditionally been handled by a controller area network (CAN) bus. A problem arises in that many of the vehicle subsystems have controllers and other components that generate and employ their own timing structures and time domains making communications among vehicle subsystems problematic. The CAN bus requires excessive clock and bit synchronization which greatly restricts the data rate of the CAN bus for advanced applications.

To address the data rate restriction of the Can bus, Ethernet is being deployed as a vehicle communications system as the vehicle control systems scale towards higher levels of automated driving, thereby increasing the need for a fault-tolerant time synchronization method on the Ethernet. The IEEE has defined a standard (802.1AS) for multiple time domains over Ethernet but does not define a protocol to achieve fault tolerance in presence of link or hardware failures. It would be desirable to provide a configuration with multiple time domains and algorithms to retain a common time base without any time jumps in presence of one or more hardware or link failures It would be desirable to address these problems and overcome the related restrictions in order to address the timing issues presented by Ethernet protocol in a vehicle environment while overcoming the aforementioned problems.

SUMMARY

Disclosed herein are object detection methods and systems and related control logic for provisioning vehicle sensing and control systems, methods for making and methods for operating such systems, and motor vehicles equipped with onboard sensor and control systems. By way of example, and not limitation, there is presented various embodiments of network timing configuration techniques are disclosed herein.

In one embodiment, a method for providing a fault tolerant network time synchronization in a motor vehicle communications network includes generating a time synchronization signal, transmitting the time synchronization signal from a first switch to a second switch via a first link and from the first switch to a third switch via a second link, detecting a link failure of the first link, and transmitting the time synchronization signal from the second switch to the third switch via a third link in response to the link failure.

In accordance with various embodiments, the link failure is detected in response to the third switch not receiving the time synchronization signal via the second link.

In accordance with various embodiments, the link failure is detected in response to the third switch not receiving the time synchronization signal via the second link for a plurality of time synchronization intervals.

In accordance with various embodiments, the second switch is operative to enable a master port in response to the link failure.

In accordance with various embodiments, the third switch is operative to couple the time synchronization signal from the second switch to an edge node and wherein the edge node is operative to synchronize a clock in response to the time synchronization signal.

In accordance with various embodiments, the time synchronization signal is generated by an edge node designated as a grandmaster.

In accordance with various embodiments, the time synchronization signal is generated by a radar controller coupled to the first switch and wherein a first radar sensor is coupled to the second switch and a second radar sensor is coupled to the third switch.

In accordance with various embodiments, a method operative to generate a follow-up frame having a timestamp for determining a latency among the first switch and the second switch.

In accordance with various embodiments, a fourth switch is operative to receive the time synchronization signal from the third switch.

In accordance with another embodiment, an apparatus includes a first network node including a first switch for transmitting a first time synchronization signal, a second network node including a second switch for receiving the first time synchronization signal from the first switch and for transmitting a second time synchronization signal to the third switch, and a third network node including the third switch for receiving the first time synchronization signal from the first switch and the second time synchronization signal from the second switch, the third node being further operative to synchronize an internal clock to the first synchronization signal in response to receiving the first time synchronization signal and to synchronize the internal clock to the second synchronization signal in response to not receiving the first time synchronization signal.

In accordance with various embodiments, the internal clock is synchronized to the second time synchronization signal in response to a detection of a link failure between the first switch and the third switch.

In accordance with various embodiments, the internal clock is synchronized to the second time synchronization signal in response to a detection of a link failure between the first switch and the third switch and wherein the link failure is determined in response to the third switch not receiving the first time synchronization signal for a plurality of time synchronization intervals.

In accordance with various embodiments, the first network node is designated as a grandmaster.

In accordance with various embodiments, the third switch is operative to redefine a port role as a master port from a slave port in response to the link failure.

In accordance with various embodiments including a fourth switch, the third switch is operative to transmit the second time synchronization signal to the fourth switch in response to the link failure.

In accordance with various embodiments, the first network node is a lidar controller the third network node is a lidar sensor.

In accordance with various embodiments, the second network node is operative to initiate a master port in response to the link failure.

In accordance with various embodiments, the first node is operative to generate a follow-up frame indicative of a first latency and the second node is operative to update the follow-up node in response to the first latency and a second latency.

In accordance with another embodiment, a vehicle network includes a vehicle controller having a first network switch and a grandmaster clock wherein the vehicle controller is operative to generate a first time synchronization frame in response to the grandmaster clock and to couple the first time synchronization from the first network switch to a second network switch via a first data link and to couple the first time synchronization from the first network switch to a third network switch via a second data link, a first vehicle sensor having the second network switch configured for receiving the first time synchronization frame via the first data link, for generating a second time synchronization frame in response to the first time synchronization frame and for transmitting the second time synchronization frame to the third network switch via a third data link, and a second vehicle sensor having the third network switch and an internal clock wherein the second vehicle sensor is operative to synchronize the internal clock with the grandmaster clock according to the first time synchronization signal in response to receiving the first time synchronization frame, the second vehicle sensor being further operative to synchronize the internal clock with the grandmaster clock according to the second time synchronization signal in response to not receiving the first time synchronization frame.

In accordance various embodiments, the second vehicle sensor is operative to synchronize the internal clock with the grandmaster clock according to the second time synchronization signal in response to not receiving the first time synchronization frame for a plurality of time synchronization intervals.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding introduction or the following detailed description. For example, the communication network and communication network protocol has particular application for use on a vehicle. However, as will be appreciated by those skilled in the art, the network configuration and methods described herein may have other applications in systems outside of vehicles.

Figure 1:
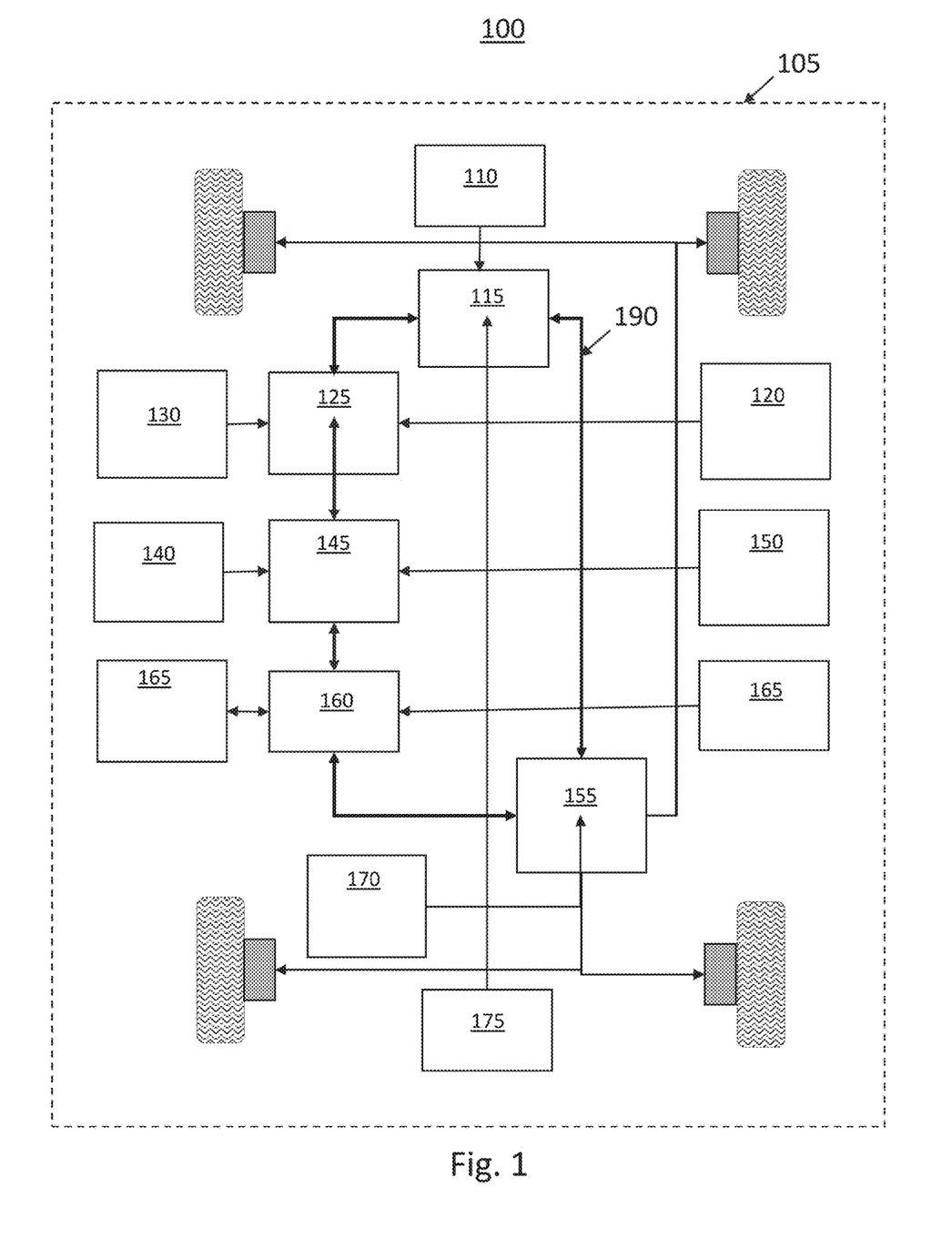
FIG. 1 illustrates an exemplary application of the method and apparatus for fault tolerant ethernet time synchronization in a motor vehicle according to an embodiment of the present disclosure.

Turning now to FIG. 1 a diagram showing a system 100 for an exemplary application of the method and apparatus for fault tolerant ethernet time synchronization in a motor vehicle 105 according to an embodiment of the present disclosure. The exemplary system 100 includes a video controller 115 coupled to a first camera 110 and a second camera 175, a lidar controller 125 coupled to a first lidar transceiver 130 and a second lidar transceiver 120, a radar controller 145 coupled to a first radar transceiver 140 and a second radar 150, a processor 160, a user interface 165, a vehicle controller 155 and a trailer interface 170.

In this exemplary embodiment, the lidar controller 125, video controller 115, radar controller 145, are each operative to receive and process data from their respective sensors. The video controller 115 is operative to receive images from the first camera 110 and the second camera 175, to process the images to generate image data for use in generating an object map around the vehicle 105. The lidar controller 125 may be operative to receive direction and distance data from each of the first lidar transceiver 130 and the second lidar transceiver 120. Likewise, the radar controller 145 may be operative to receive direction and distance data from each of the first radar transceiver 140 and the second radar 150. The image data, lidar data and radar data may be combined, using sensor fusion techniques or the like, to generate a three-dimensional object map of the area surrounding the vehicle 105. This three-dimensional map may then be coordinated with high definition road maps received via a wireless transmission and stored in a memory.

The processor 160 may use the three-dimensional object map, the high definition road maps, vehicle sensor data and user data received via the user interface 165 as inputs into an ADAS algorithm, such as adaptive cruise control, lane centering operations, autonomous lane changes, obstacle avoidance or the like. In response to the ADAS algorithm, the processor 160 may then generate control signals to couple to the vehicle controller 155 in order to control the vehicle operation. For example, the vehicle controller 155 may generate steering control signals to couple to a steering controller, throttle control signals to couple to a throttle controller, and brake control signals to couple to a braking controller.

Timing is an important aspect for each controller 155 and the processor 160 in order to coordinate data. For instance, radar, lidar and image data is not useful if it cannot be accurately provided to the processor 160 in order to provide accurate control signals to the vehicle controller 155. Furthermore, in a vehicle environment, it is critical that this timing data and associated intersystem communications be accurately communicated in the presence of system faults or communication channel failures. To address this problem, the exemplary system provides for a timing startup protocol to avoid time jumps by employing an agreement protocol considering multiple time domains and multiple failure conditions. This time synchronization in the presence of faults enables fail operational applications relying on a global notion of time, such as level 4 autonomous vehicles.

In an exemplary embodiment, the system 100 is operative to employ a communications bus 190 where each of the controllers are coupled to two other controllers in a ring configuration. Data sent via the network may be unidirectional or bidirectional. Use of multiple clock trees may be used to form multiple time domains. The exemplary startup protocol may be used to select time domain in normal operating mode and in all failure modes in order to guaranteed consistency among all endpoints in the system, regardless of failure mode. In one exemplary embodiment, the startup protocol may use for multiple Grand Masters while guaranteeing absence of time jumps in case Grand Masters fail at runtime. The startup protocol to switch among multiple clock trees (multiple time domains) in presence of failures to guarantee absence of time jumps in failure modes.

The system 100 is operative to provide a protocol to provide for time synchronization for multiple systems in multiple time domains in a normal mode and in failure modes. In this example, an end node within a first time domain may be chosen as a grandmaster for providing a root timing reference to the first time domain. The end node having the grandmaster is operative to periodically transmit synchronization information to the clocks residing within the first time domain. The end node having the grandmaster is further operative to transmit a follow-up frame which is used to keep track of the transit times by each node in the network. Using the follow-up frame, a node can utilize the sync frame and the follow-up frame to sync with the grandmaster. In addition, systems with clocks within the first time domain may then relay accurate time to the additional time domains to which they are also connected. The exemplary system can then guarantee consistency among all endpoints in the system, regardless of failure mode.

In the exemplary system 100, the video controller 115, lidar controller 125, radar controller 145, processor 160 and vehicle controller 155 may be configured to form a time domain. In normal mode, the processor 160 may be chosen to have the grandmaster clock and may be operative to transmit sync packets to the other nodes in the time domain in response to the grandmaster clock. In this example, the processor 160 has a master port and the radar controller 145 has a slave port. The radar controller 145 transmits a time sync signal via a master port to a slave port at the lidar controller 125, the lidar controller 125 transmits a time sync signal via a master port to a slave port at the video controller 115 which transmits a time sync signal via a master port to a slave port at the vehicle controller 155. Each node within the time domain is operative to time sync with the sync frame received from its respective master port and to discard other time frames received.

In the event of a link failure, a node within the time domain may stop receiving sync frames via its slave port from the designated node master port. For example, if there is a link failure between the lidar controller 125 and the video controller 115, the video controller will stop receiving sync frames from the lidar controller 125. In addition, the video controller 115 will stop generating sync signals to be transmitted and therefore the vehicle controller 155 will stop receiving sync signals from the video controller 115. In response to not receiving a number of sync signals from a designated node, a node may determine that a failure mode exists and resort to an alternate designated node master port. In this example, the processor 160 would then become transmit sync signals to the vehicle controller 155 and the vehicle controller 155 would transmit sync signals to the video controller 115. In the failure mode, the video controller 115 would then synchronize its clock to the sync frame and follow-up frame received from the vehicle controller 155. Likewise, the vehicle controller 155 would synchronize its clock to the sync frame and follow-up frame received from the processor 160.

In this exemplary time domain, each node would only require one alternate node for receiving time sync signals when a failure mode is detected. For example in the exemplary time domain, the lidar controller 125 would synchronize with a sync frame from the radar controller 145 unless there was a link failure between the processor 160 and the radar controller 145 or between the radar controller 145 and the lidar controller 125. In the instance of any other link failure, the lidar controller 125 would still receive a sync frame from the radar controller 145. If the lidar controller 125 stopped receiving sync frames from the radar controller 145, the lidar controller 125 would then switch to the video controller 155 as a master.

Figure 2:
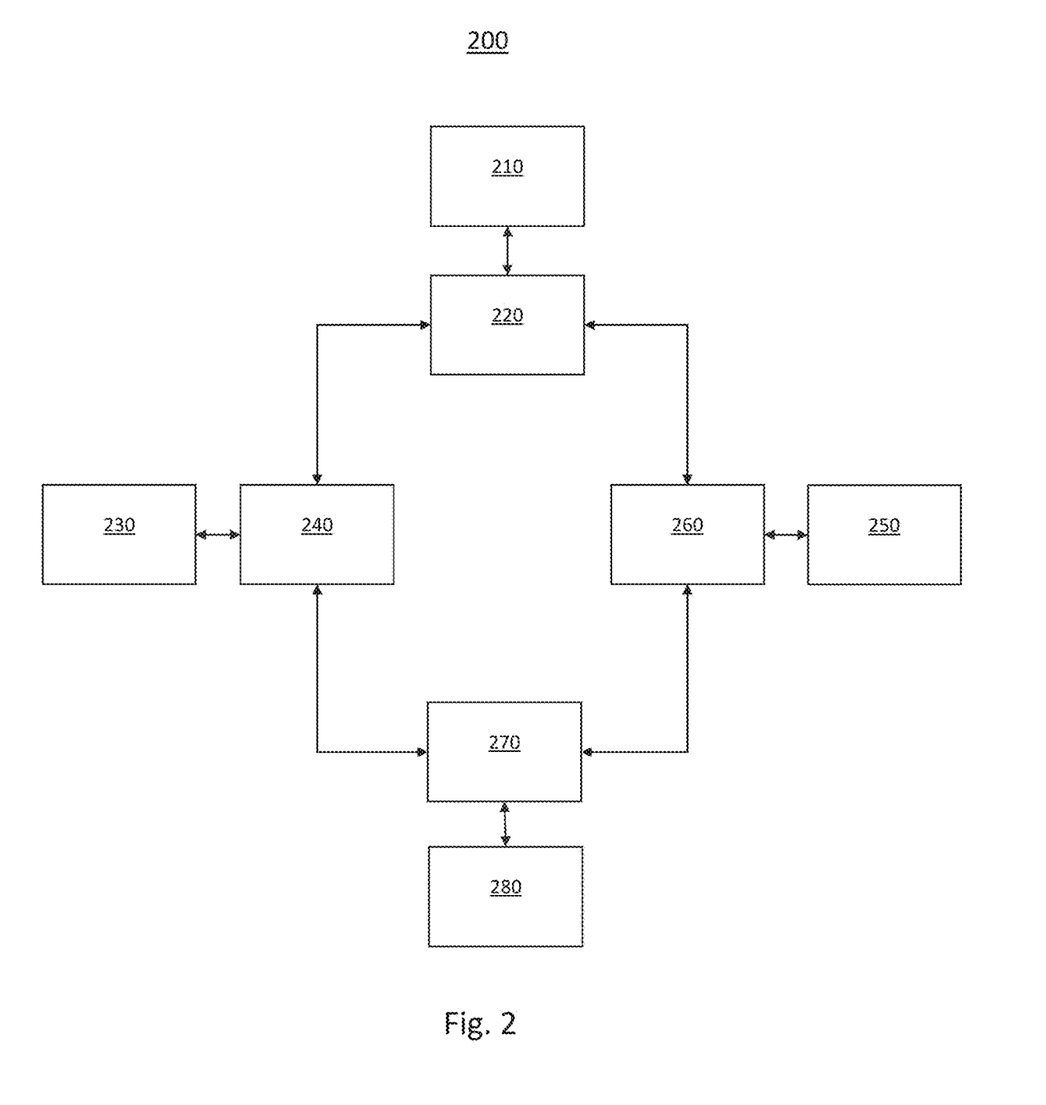
FIG. 2 shows a block diagram illustrating an exemplary system for fault tolerant Ethernet time synchronization in a motor vehicle according to an embodiment of the present disclosure.

Turning now to FIG. 2, a block diagram depicting an exemplary system 200 for fault tolerant Ethernet time synchronization in a motor vehicle is shown. In this exemplary embodiment, the system 200 may include an Ethernet protocol network configured in a ring configuration. The exemplary network may include switches S1 220, S2 240, S3 260, S4 270, and edge nodes or end points E1 210, E2 230, E3 250, E4 280. In some configurations, a switch S1 220, S2 240, S3 260, S4 270 may be integrated with an edge node E1 210, E2 230, E3 250, E4 280. For example, a lidar sensor may be an edge node in the network with an integrated switch. During normal operation, E1 210 may be designated as a grandmaster clock and S1 220 is a slave to E1 210. S1 220 is then a master to both S2 240 and S3 260 with E2 230 being a slave to S2 240 and E3 250 being a slave to S3 260. In this exemplary embodiment, S4 270 is then a slave to S2 240 and the link between S3 260 and S5 is disabled for clock synchronization purposes.

A link fault may be detected in response to an edge node not receiving an anticipated sync packet from master node. For example, should a link fault occur between S1 220 and S3 260, E3 250 will no longer receive sync packets from E1 210. E3 250 would then switch to an alternate configuration, or domain, in that S4 270 would then become the alternate master to S3 260 and E2 230 would being to receive sync packets from E4 280. In the occurrence of a link fault between S1 220 and S3 260, S3 260 becomes a slave to S4 270 with the link between S1 220 and S3 260 being disabled. Likewise, in the occurrence of a link failure between S1 220 and S2 240, S4 270 becomes a slave to S3 260 and S2 240 becomes a slave to S4 270 with the link between S1 220 and S2 240 being disabled. Should there be an occurrence of a link failure between S2 240 and S4 270, S3 260 becomes a master to S4 270 with S1 220 being a master to both S2 240 and S3 260 and the link between S2 240 and S4 270 is disabled. For each possible link fault, nodes not receiving sync packets would switch to an alternate master node.

To accommodate for a link failure that would isolate the designated grandmaster node or a runtime failure of a grandmaster, a startup protocol for multiple grandmasters is provided for guaranteeing absence of time jumps. To avoid these problems, a secondary grandmaster is designated for each time domain. Upon startup, the secondary grandmaster initiates its own clock. The secondary grandmaster is the operative to attempt to receive the sync frame from the primary grandmaster via the normal master node. If the sync frame is not received via the normal master node, the secondary grandmaster is operative to attempt to receive the sync frame from the alternate master node. If the sync frame is not received within a predetermined period of time from the alternate master node, the second grandmaster is then operative to generate and transmit a sync packet in response to its own clock as the primary grandmaster. If a sync frame is received from the grandmaster upon startup, the secondary grandmaster is operative to sync its own clock to that of the grandmaster. If at a later time, there is a link failure and sync packets are no longer received from the grandmaster via the normal master node or the alternate master node, the secondary grandmaster generates a sync frame from its own previously synchronized clock and to transmit this sync frame via the time domain network. This startup protocol guarantees an absence of time jumps in failure modes as the secondary grandmaster clock is synchronized to the primary grandmaster.

Figure 3:
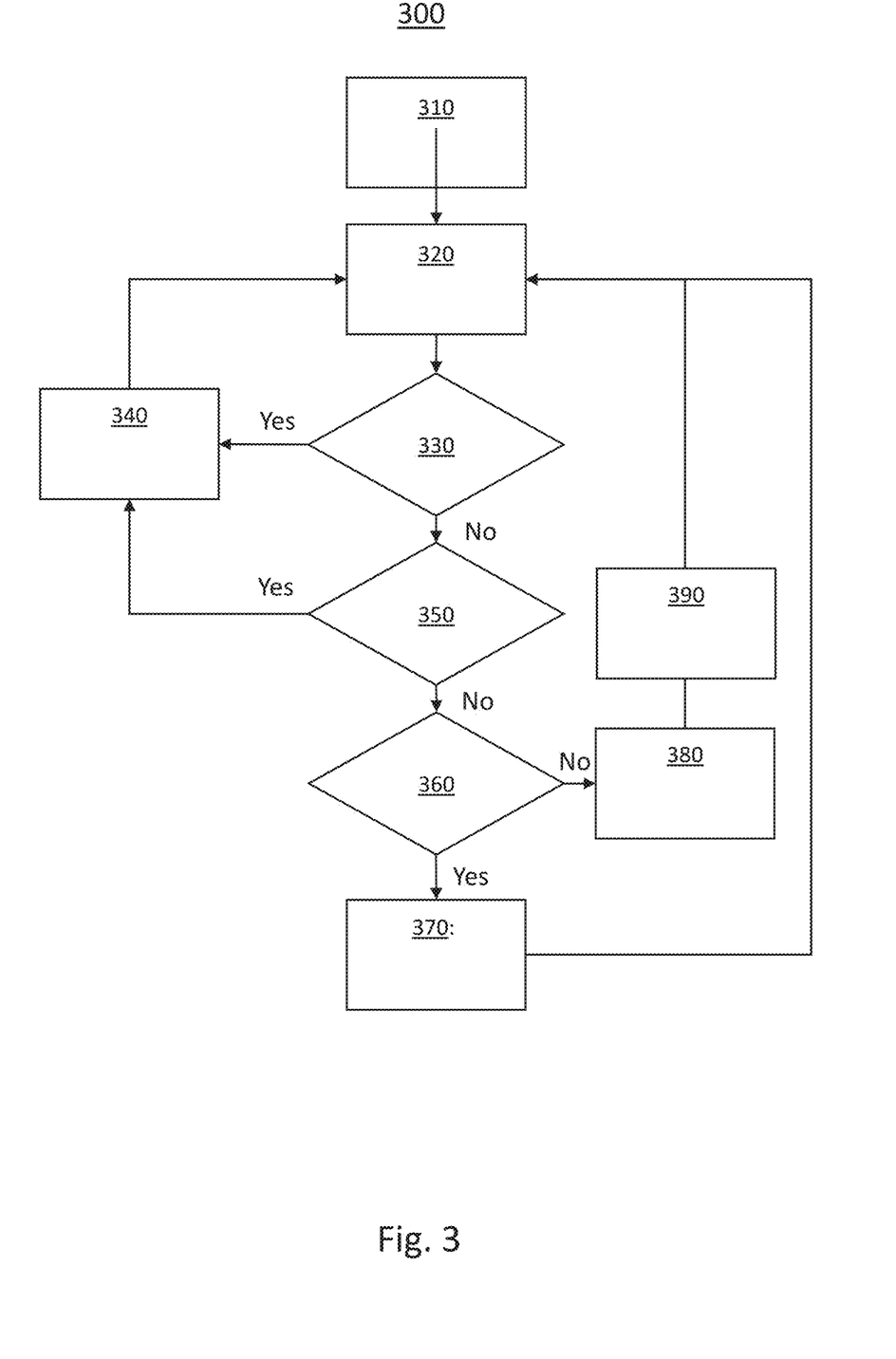
FIG. 3 shows a flowchart illustrating an exemplary method for fault tolerant Ethernet time synchronization according to an embodiment of the present disclosure.

Turning now to FIG. 3, a flowchart illustrating an exemplary method 300 for fault tolerant ethernet time synchronization in a motor vehicle is shown. In this exemplary embodiment an edge node is operative to perform the exemplary method 300. The exemplary method 300 is first operative to initialize 310 an internal clock. After initialization of the internal clock, the method is next operative to operate with a timing according to the internal clock at 320. For example, the exemplary edge node may be a radar controller operative to perform a vehicular radar algorithm. The radar controller may be further operative to cascade its internal clock via a sync signal to radar sensors thereby forming another time domain with the radar sensors.

The method is next operative to determine at 330 if a sync signal has been received from a primary grandmaster node. If the sync signal has been received from the primary grandmaster node, the method 300 is next operative to sync the internal clock at 340 and return to operating with the internal clock at 320. If the sync signal has not been received from the primary grandmaster node for a predetermined number of clock cycles, such as eight clock cycles, the method 300 is then operative to determine at 350 if a sync signal has been received at a switching portion of the edge node from an alternate master. If the sync signal has been received from the alternate master at 350, the method 300 is then operative to sync at 340 the internal clock to the sync signal from the alternate master and to return to operating at 320 with the internal clock. In one exemplary embodiment, the alternate master may become the primary master with the previous primary master becoming the alternate master depending on design criteria. Alternatively, the alternate primary may remain the alternate primary and the edge node continues to first check for sync signals from the primary master before syncing to a sync signal from the alternate master.

If no sync signal is received from the alternate master a t350, the method 300 is next operative to determine if the current edge node running the method has been designated as an alternate grandmaster at 360. If the current edge node has not been designated as an alternate grandmaster at 360, the method 300 may then operative to generate at 380 an error signal indicative of a synchronization loss and couple this error signal to a system controller, vehicle controller or other supervisory controller. The method may then return to operating at 320 with the current clock. Alternatively, the current node may shutdown 390, go into a standby state, or into an alternate operating state in response to a synchronization loss.

If the current node is determined to be an alternate grandmaster at 360, the method 300 is then operative to generate and transmit 370 a sync signal via the ethernet network to the other nodes. The method may further generate a follow-up frame indicative of accumulated propagation delays or the like. After transmission 370 of the sync signal, the method may then return to operating 320 with the current clock.

Figure 4:
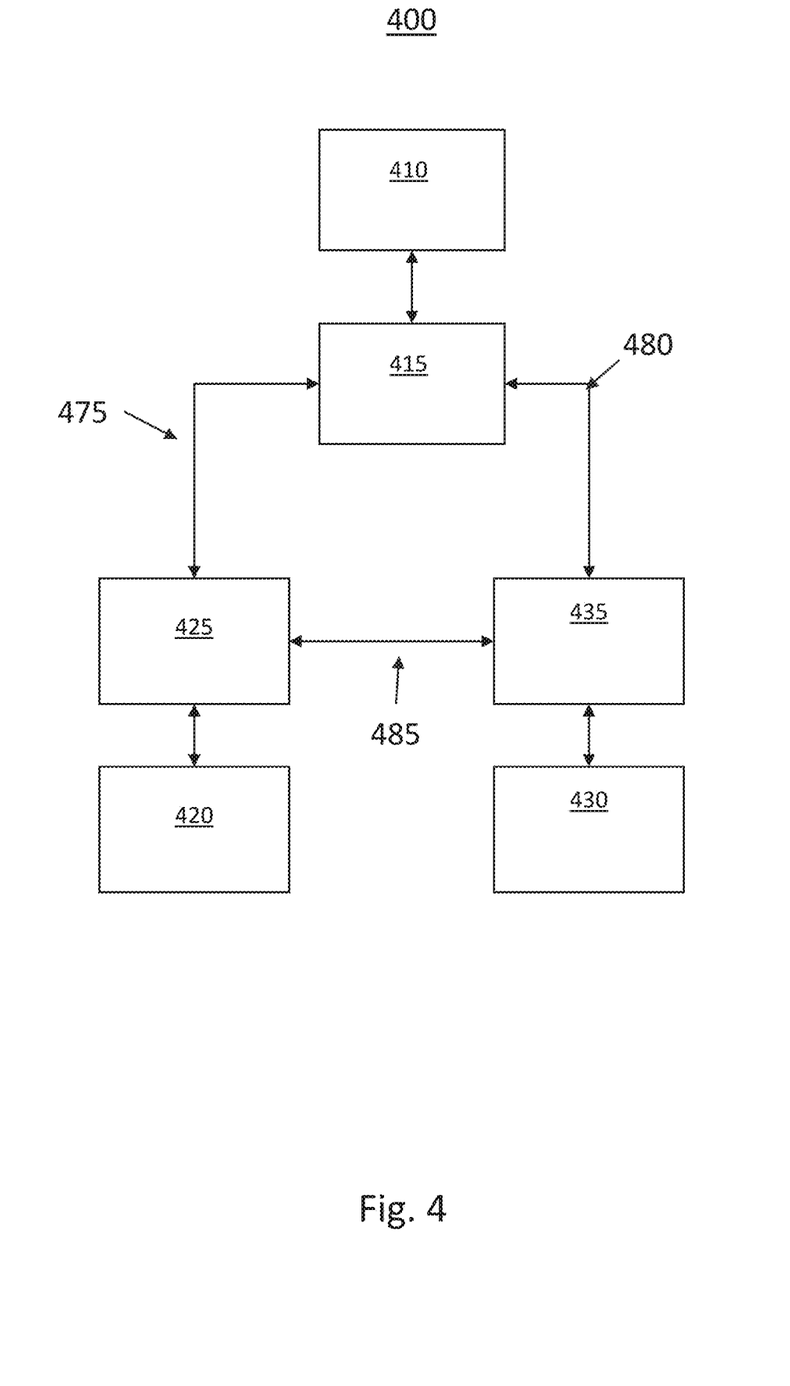
FIG. 4 shows a block diagram illustrating another exemplary system for fault tolerant Ethernet time synchronization in a motor vehicle according to an embodiment of the present disclosure.

Turning now to FIG. 4, a block diagram illustrating an exemplary system 400 for fault tolerant ethernet time synchronization in a motor vehicle network is shown. The exemplary system 400 may include a first network node 410 and a first switch 415, a second network node 420 and a second switch 425, and a third network node 430 and a third switch 435. The first network switch may be coupled to the second network switch by a first link 475. The first network switch 415 may be coupled to a third network switch by a second link 480. In The second network switch 425 may be coupled to the third network switch 435 by a third link 485.

In the exemplary embodiment, the first network node 410, coupled to a first switch 415, is configured for generating and transmitting a first time synchronization signal in response to a first clock internal to the first network node 410. The first switch 415 may be integral to the first network node and is configured to transmit data on an Ethernet network via a master port and to receive data from the Ethernet network via a slave port. These ports are configurable and may be switched from master to slave or slave to master in response to a network link failure, control signal from the first network node 410, or the like. In one exemplary embodiment, the first clock may be designated as grandmaster clock to be used as a timing reference for all nodes with the time domain of the Ethernet network. The first network node 410 may be further configured to generate a follow-up frame indicative of a first latency resulting from processing of the first time synchronization signal by the first switch 415 and the second network node 420 is operative to update the follow-up node in response to the first latency and a second latency resulting from processing of the first time synchronization signal by the second switch 425.

The second network node 420 including the second switch 425 may be configured for receiving the first time synchronization signal from the first switch 415 and for transmitting a second time synchronization signal to the third switch 435. In one exemplary application, the first network node 410 may be a lidar controller the second network node 420 may be a lidar sensor. In response to a network link failure, the second network node 420 may initiate a master port in response to the link failure.

In this exemplary embodiment, the third network node 430 including the third switch 435 is configured for receiving the first time synchronization signal from the first switch 415 and the second time synchronization signal from the second switch 425. The third network node 430 may be further operative to synchronize a third node internal clock to the first synchronization signal in response to receiving the first time synchronization signal from the first switch 415 via the second link 480. The third network node 430 may be further operative to synchronize the internal clock to the second synchronization signal in response to not receiving the first time synchronization signal from the first switch 415 via the second link 480. In one exemplary embodiment, the internal clock may be synchronized to the second time synchronization signal in response to a detection of a link failure between the first switch 415 and the third switch 435 wherein the link failure is determined in response to the third switch 435 not receiving the first time synchronization signal for a plurality of time synchronization intervals. In one exemplary application, the third switch 435 may be operative to redefine a port role as a master port from a slave port in response to the link failure. The exemplary system may further include a fourth switch where the third switch 435 may be operative to transmit the second time synchronization signal to the fourth switch in response to the link failure.

In an exemplary embodiment, the exemplary system 400 may be a vehicle communications network including a vehicle controller having a first network switch and a grandmaster clock wherein the vehicle controller is operative to generate a first time synchronization frame in response to the grandmaster clock and to couple the first time synchronization from the first network switch to a second network switch via a first data link and to couple the first time synchronization from the first network switch to a third network switch via a second data link. The exemplary system 400 further includes a first vehicle sensor having the second network switch configured for receiving the first time synchronization frame via the first data link configured for generating a second time synchronization frame in response to the first time synchronization frame and for transmitting the second time synchronization frame to the third network switch via a third data link. The exemplary system 400 further includes a second vehicle sensor having the third network switch and an internal clock wherein the second vehicle sensor is operative to synchronize the internal clock with the grandmaster clock according to the first time synchronization signal in response to receiving the first time synchronization frame, to synchronize the internal clock with the grandmaster clock according to the second time synchronization signal in response to not receiving the first time synchronization frame. In addition, the second vehicle sensor may be configured to synchronize the internal clock with the grandmaster clock according to the second time synchronization signal in response to not receiving the first time synchronization frame for a plurality of time synchronization intervals.

Figure 5:
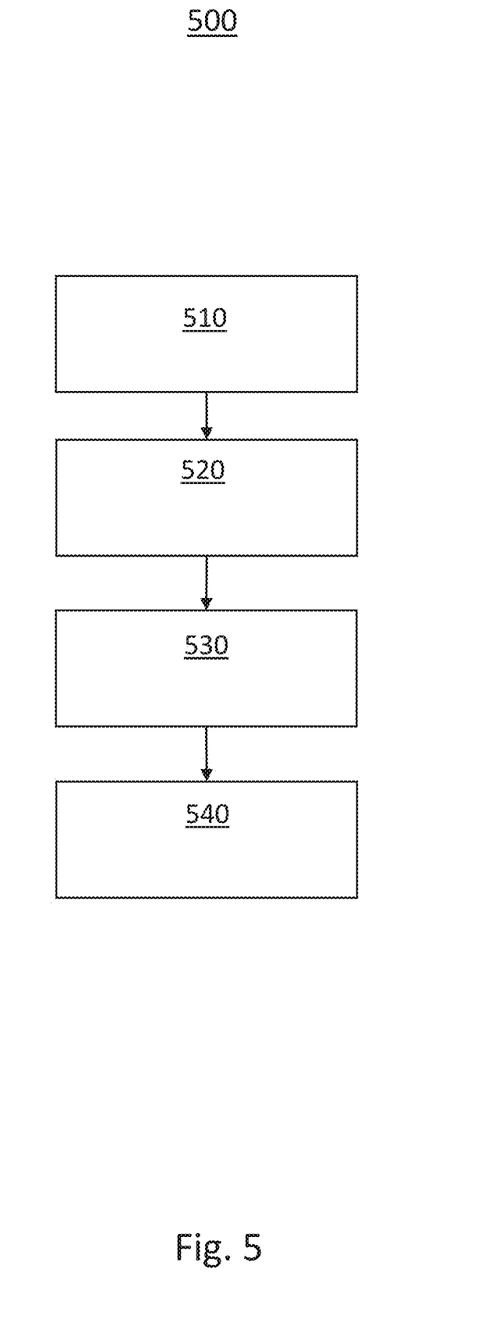
FIG. 5 shows a flowchart illustrating another exemplary method for fault tolerant Ethernet time synchronization according to an embodiment of the present disclosure; and The exemplifications set out herein illustrate preferred embodiments of the invention, and such exemplifications are not to be construed as limiting the scope of the invention in any manner.

Turning now to FIG. 5, a block diagram illustrating an exemplary method 500 for fault tolerant ethernet time synchronization during grand master failure in a motor vehicle is shown. The exemplary method is first operative for generating 510 a time synchronization signal for synchronizing multiple nodes in a multiple time domain network configuration. The time synchronization signal may be generated by an edge node designated as a grandmaster. For example, the time synchronization signal may generated by a radar controller coupled to a first radar sensor and a second radar sensor. In one exemplary embodiment, each of the radar sensors may be an edge node with an integrated switch node having at least one port configured in a slave mode. The method may be further operative to generate a follow-up frame having a timestamp for determining a latency accumulated during propagation through one or more switch nodes and an end node.

The method may the transmit 520 the time synchronization signal from a first switch to a second switch via a first link and from the first switch to a third switch via a second link. In one exemplary embodiment, there may be a third link between the second switch and the third switch which is disabled for network synchronization purposes.

The method is next operative for detecting 530 a link failure of the second link, the link failure is detected in response to the third switch not receiving the time synchronization signal via the second link. In one exemplary embodiment, the link failure may be detected in response to the third switch not receiving the time synchronization signal via the second link for a plurality of time synchronization intervals.

In response to detecting the link failure, the method 500 is then configured for transmitting 540 the time synchronization signal from the second switch to the third switch via a third link. The second switch may enable a master port in response to the link failure wherein the port had previously been configured as a slave port. The third switch may receive the time synchronization signal from the second switch and then couple the time synchronization signal to an edge node. In response, the edge node may synchronize an internal clock in response to the time synchronization signal. In addition, the exemplary system may include a fourth switch operative to receive the time synchronization signal from the third switch. In this exemplary embodiment, the third switch may enable a master port to transmit the time synchronization signal to the fourth switch.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for providing a fault tolerant network time synchronization in a motor vehicle communications network comprising:
    generating a time synchronization signal;
    transmitting the time synchronization signal from a first switch to a second switch via a first link and from the first switch to a third switch via a second link;
    detecting a link failure of the second link; and
    transmitting the time synchronization signal from the second switch to the third switch via a third link in response to the link failure wherein the third switch is operative to couple the time synchronization signal from the second switch to an edge node and wherein the edge node is operative to synchronize a clock in response to the time synchronization signal, wherein the edge node receives the time synchronization signal only from the third switch.

2. The method of claim 1 wherein the link failure is detected in response to the third switch not receiving the time synchronization signal via the second link.

3. The method of claim 2 wherein the link failure is detected in response to the third switch not receiving the time synchronization signal via the second link for a plurality of time synchronization intervals.

4. The method of claim 1 wherein the second switch is operative to enable a master port in response to the link failure.

5. The method of claim 1 wherein the time synchronization signal is generated by an edge node designated as a grandmaster.

6. The method of claim 1 wherein the time synchronization signal is generated by a radar controller coupled to the first switch and wherein a first radar sensor is coupled to the second switch and a second radar sensor is coupled to the third switch.

7. The method of claim 1 further operative to generate a follow-up frame having a timestamp for determining a latency among the first switch and the second switch.

8. The method of claim 1 further including a fourth switch operative to receive the time synchronization signal from the third switch.

9. An apparatus comprising:
    a first network node including a first switch with processing circuitry for transmitting a first time synchronization signal;
    a second network node including a second switch with processing circuitry for receiving the first time synchronization signal from the first switch and for transmitting a second time synchronization signal to a third switch; and
    a third network node including the third switch with processing circuitry for receiving the first time synchronization signal from the first switch and the second time synchronization signal from the second switch, the third node being further operative to synchronize an internal clock to the first synchronization signal in response to receiving the first time synchronization signal and to synchronize the internal clock to the second synchronization signal in response to not receiving the first time synchronization signal, wherein the third switch is further operative to couple the second time synchronization signal from the second switch to an edge node and wherein the edge node is operative to synchronize a clock in response to the second time synchronization signal, wherein the edge node receives the time synchronization signal only from the third switch.

10. The apparatus of claim 9 wherein the internal clock is synchronized to the second time synchronization signal in response to a detection of a link failure between the first switch and the third switch.

11. The apparatus of claim 10 wherein the internal clock is synchronized to the second time synchronization signal in response to a detection of a link failure between the first switch and the third switch and wherein the link failure is determined in response to the third switch not receiving the first time synchronization signal for a plurality of time synchronization intervals.

12. The apparatus of claim 9 wherein the first network node is designated as a grandmaster.

13. The apparatus of claim 9 wherein the third switch is operative to redefine a port role as a master port from a slave port in response to not receiving the first time synchronization signal.

14. The apparatus of claim 9 further including a fourth switch and wherein the third switch is operative to transmit the second time synchronization signal to the fourth switch in response to not receiving the first time synchronization signal.

15. The apparatus of claim 9 wherein the first network node is a lidar and controller the third network node is a lidar sensor.

16. The apparatus of claim 9 wherein the second network node is operative to initiate a master port in response to not receiving the first time synchronization signal.

17. The apparatus of claim 9 wherein the first node is operative to generate a follow-up frame indicative of a first latency and the second node is operative to update the follow-up node in response to the first latency and a second latency.

18. A vehicle network comprising;
- a vehicle controller having a first network switch and a grandmaster clock wherein the vehicle controller is configured with processing circuitry operative to generate a first time synchronization frame in response to the grandmaster clock and to couple the first time synchronization from the first network switch to a second network switch via a first data link and to couple the first time synchronization from the first network switch to a third network switch via a second data link;
- a first vehicle sensor having the second network switch configured with processing circuitry for receiving the first time synchronization frame via the first data link, for generating a second time synchronization frame in response to the first time synchronization frame and for transmitting the second time synchronization frame to the third network switch via a third data link; and
- a second vehicle sensor having the third network switch and an internal clock wherein the second vehicle sensor is configured with processing circuitry operative to synchronize the internal clock with the grandmaster clock according to the first time synchronization signal in response to receiving the first time synchronization frame, the second vehicle sensor being further operative to synchronize the internal clock with the grandmaster clock according to the second time synchronization signal in response to not receiving the first time synchronization frame wherein the third network switch is operative to couple the second time synchronization signal from the second switch to an edge node and wherein the edge node is operative to synchronize a clock in response to the second time synchronization signal, wherein the edge node receives the time synchronization signal only from the third switch.

19. The vehicle network of claim 18 wherein the second vehicle sensor is operative to synchronize the internal clock with the grandmaster clock according to the second time synchronization signal in response to not receiving the first time synchronization frame for a plurality of time synchronization intervals.

\* \* \* \* \*